(12) United States Patent
Justesen et al.

(10) Patent No.: US 7,918,468 B2
(45) Date of Patent: Apr. 5, 2011

(54) DROP-DOWN EXTRA AXLE FOR UTILITY TRUCK

(75) Inventors: Neil Justesen, Burley, ID (US); Arlan Woodridge, Burley, ID (US); Ryan Pearson, Burley, ID (US); Larry Carter, Burley, ID (US)

(73) Assignees: Ryan Pearson, Burley, ID (US); Larry Carter, Burley, ID (US)

( * ) Notice: Subject to any disclaimer, the term of this patent is extended or adjusted under 35 U.S.C. 154(b) by 175 days.

(21) Appl. No.: 11/639,734

(22) Filed: Dec. 14, 2006

(65) Prior Publication Data

US 2007/0210548 A1 Sep. 13, 2007

Related U.S. Application Data

(60) Provisional application No. 60/750,741, filed on Dec. 14, 2005.

(51) Int. Cl.
*B62D 61/12* (2006.01)
(52) U.S. Cl. .............. 280/86.5; 180/24.02; 180/209; 180/311; 280/781
(58) Field of Classification Search ............ 280/86.5, 280/781; 180/209, 24.02, 311, 312
See application file for complete search history.

(56) References Cited

U.S. PATENT DOCUMENTS

| | | | | | |
|---|---|---|---|---|---|
| 3,197,237 | A | * | 7/1965 | Smith | 280/418.1 |
| 3,704,896 | A | * | 12/1972 | Buelow | 280/81.6 |
| 3,843,148 | A | * | 10/1974 | Wright | 280/86.5 |
| 5,897,123 | A | * | 4/1999 | Cherney et al. | 280/86.5 |
| 6,311,993 | B1 | * | 11/2001 | Hulstein et al. | 280/86.5 |
| 6,808,035 | B1 | * | 10/2004 | Keeler | 180/197 |
| 6,997,464 | B2 | * | 2/2006 | Yakimishyn | 280/6.159 |

* cited by examiner

*Primary Examiner* — Eric Culbreth
(74) *Attorney, Agent, or Firm* — Robert L. Shaver; Dykas & Shaver, LLP

(57) ABSTRACT

The present invention is a drop-down extra axle and wheel set for a utility truck. The extra axle and wheels are pivotally connected to an extra frame set that overlies and/or extends along the original frame for the truck, from the back end of the truck frame to near its midpoint just behind the cab of the truck. The extra frame set is a generally horizontal, rectangular piece that lays over the top of, and/or extends along, from the back end of to just behind the cab of, the original truck frame. The extra frame set has a trailing, extra, axle support assembly near its back end. The extra axle support assembly depends down from the extra frame, and supports an extra axle and wheel set at its bottom. A set of pivoting connecting rods extend forwardly from the bottom of the extra axle support assembly to pivot brackets which also depend down from the extra frame several feet forward of the extra axle support assembly. The position of the extra axle support assembly, either wheels-down on the roadway, or wheels-up off the roadway, is determined by a set of air bags, one on each side, enclosed in the extra axle support assembly.

7 Claims, 9 Drawing Sheets

DROP-DOWN EXTRA AXLE FOR UTILITY TRUCK

This application claims priority of Provisional Application Ser. No. 60/750,741, filed Dec. 14, 2005, and entitled "Drop-Down Extra Axle For Utility Truck" which is hereby incorporated by reference.

BACKGROUND OF THE INVENTION

1. Field of the Invention

This invention relates generally to axles, wheels and suspensions for vehicles. More specifically, this invention relates to a drop-down extra axle and wheel set for a utility truck, like a pick-up truck, for example, when extra support is needed for additional load on the truck.

2. Related Art

U.S. Pat. No. 3,743,315 (Bilas) discloses an extra axle and wheel set for a trailer. The extra axle and wheel set are urged up off the roadway from a pivot bracket on the main frame of the trailer by a semi-elliptical spring positioned transversely of the vehicle longitudinal axis. The extra axle and wheel set are urged down on the roadway by a set of air bags.

U.S. Pat. No. 4,146,243 (Sims) discloses an extra axle and wheel set for the rear of a cement truck. The extra axle and wheel set are urged up and down, off and on the roadway, respectively, by a set of air bags. A hydraulic ram device on each wheel further lifts the extra axle and wheel set up into a transport position.

U.S. Pat. No. 4,705,133 (Christenson, et al.) also discloses an extra axle and wheel set for a cement truck. The extra axle and wheel set pivots up and forwardly from a point on the rear end of the main frame to be lifted off the roadway by a hydraulic ram. In the lifted position, the extra axle and wheel set straddles the rear end of the truck frame.

U.S. Pat. No. 5,370,196 (Bishop) discloses an extra axle and wheel set for a vehicle. The extra axle and wheel set pivotally attach to a bracket which is bolted to the rear part of the frame of the vehicle. The extra axle and wheel set is lifted off the roadway by a hydraulic ram.

Still, there is a need for a simple, strong and economical drop-down extra axle and wheel set for a truck. This invention addresses that need.

SUMMARY OF THE INVENTION

The present invention is a drop-down extra axle and wheel set for a utility truck. The extra axle and wheels are pivotally connected to an extra frame set that overlies and/or extends along the original frame for the truck, from the back end of the truck frame to near its midpoint just behind the cab of the truck. The extra frame set is a generally horizontal, rectangular piece that lays over the top of, and/or extends along, from the back end of to just behind the cab of, the original truck frame. The extra frame set has a first, rear transverse strut, and a trailing, extra, axle support assembly near its back end. Preferably, the extra axle support assembly depends down from the extra frame, and supports an extra axle and wheel set at its bottom. A set of pivoting connecting spring rods extend forwardly from the bottom of the extra axle support assembly to pivot brackets which also depend down from the extra frame several feet forward of the extra axle support assembly. The position of the extra axle support assembly is determined by a set of air bags, one on each side, enclosed in the extra axle support assembly.

Optionally, the extra frame set also has a second, middle transverse strut, and a primary rear axle suspension assembly near its middle. The primary rear axle suspension assembly depends downwardly from the extra frame, and assists with the suspension of the original rear axle of the truck. A set of original rear suspension air bags, one on each side of the extra frame, and cooperating with the original rear axle, acts to assist in the suspension of the original rear wheels.

Optionally also, the extra frame set has a third, front transverse strut, and a suspension air control unit and a pressurized air reservoir for the air bags, near its front end, just behind the cab of the truck. The suspension control unit and reservoir cooperate with the two air bags in the extra axle support assembly, and the two air bags in the primary rear axle suspension assembly, to control the rear suspensions of the truck.

DETAILED DESCRIPTION OF THE INVENTION

Referring to the figures, there is shown one, but not the only, embodiment of the invented [device].

Figure 1:
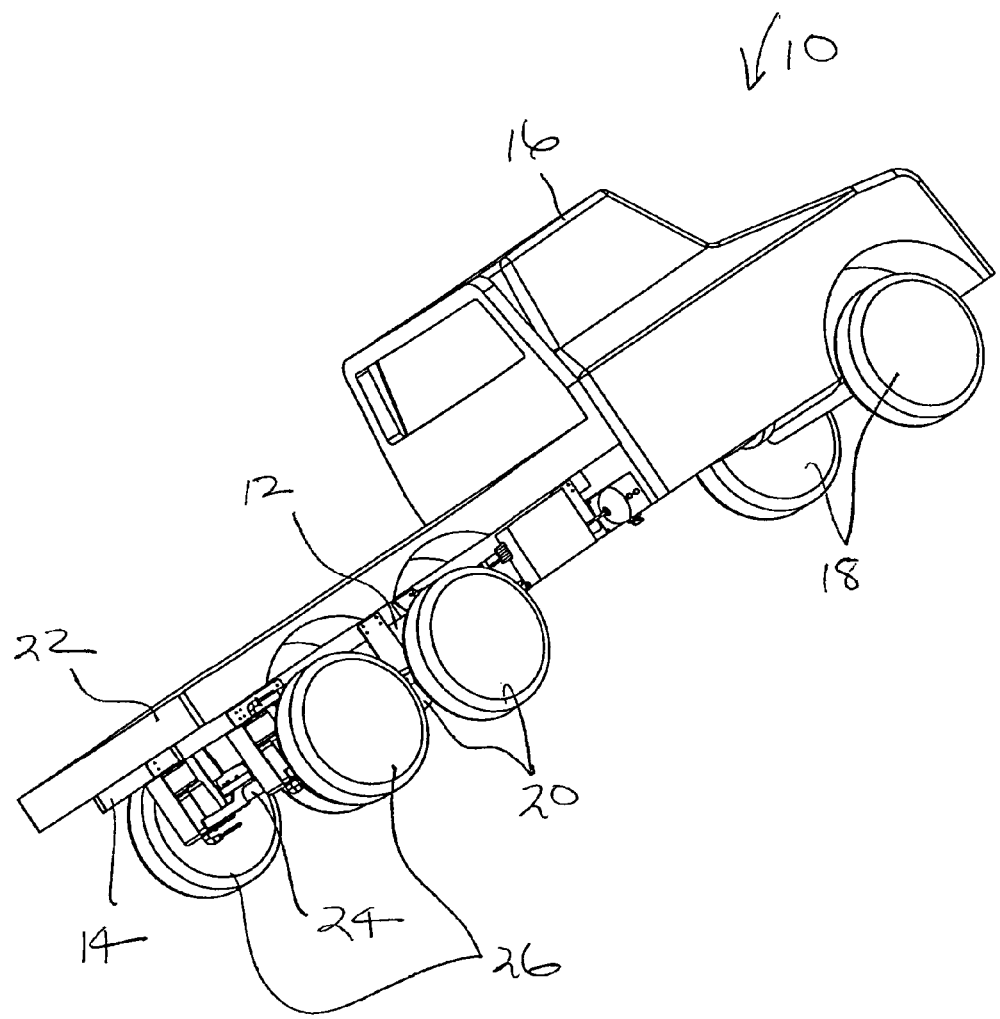
FIG. 1 is a schematic, rear perspective view of one embodiment of the invention.

Utility truck 10 has original frame 12 and an extra frame set 14 which overlies and/or extends along original frame 12 (see FIG. 1). Extra frame set 14 is secured to original frame 12 by appropriate bolts and/or welds, and/or by other conventional securement means. Extra frame set 14 is built to be compatible and cooperate with original frame 12. Therefore, extra frame set 14 may preferably be customized to some extent so that different models of the extra frame fit nicely with the various models of utility trucks. Also, extra frame set 14 may preferably be generalized to be a "one-model-fits-most" item, and one model of the extra frame set be provided with the necessary or convenient adaptive couplings to fit most truck models. Either of these approaches is considered to be within the scope of this invention.

Truck 10 also has cab 16, front wheels 18 and original rear wheels 20. By "original" we mean original equipment manufacture ("OEM"), or conventionally supplied equipment when the vehicle is purchased new. Truck also has bed 22 for receiving a load. Bed 22 may be adapted to be received by either or both original frame 12 and extra frame set 14, according to conventional techniques. As the weight load on bed 22 is increased, the load limit on original rear wheels 20 may be approached or exceeded. In this case, according to the present invention, drop-down extra axle 24 and extra wheel set 26 may be lowered onto the roadway in order to provide additional support for the increased load. Other, conventional means for lowering and raising the drop-down extra axle 24 and extra wheel set 26 may be used. For example, a hydraulic ram device as in U.S. Pat. Nos. 4,146,243 and 5,370,196, discussed above.

Figure 4:
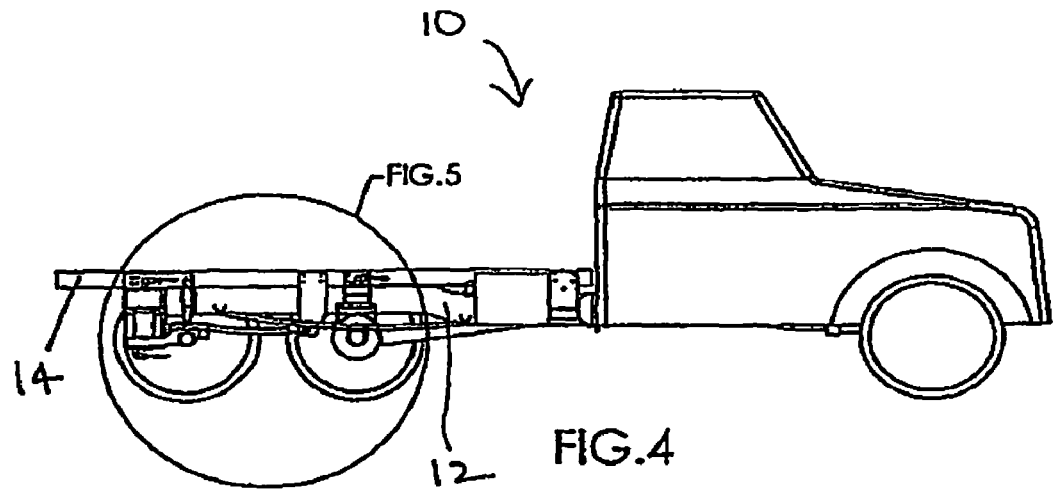
FIG. 4 is a side, schematic view of the wheels-down position depicted in FIG. 2, with the right side rear wheels removed.
Figure 5:
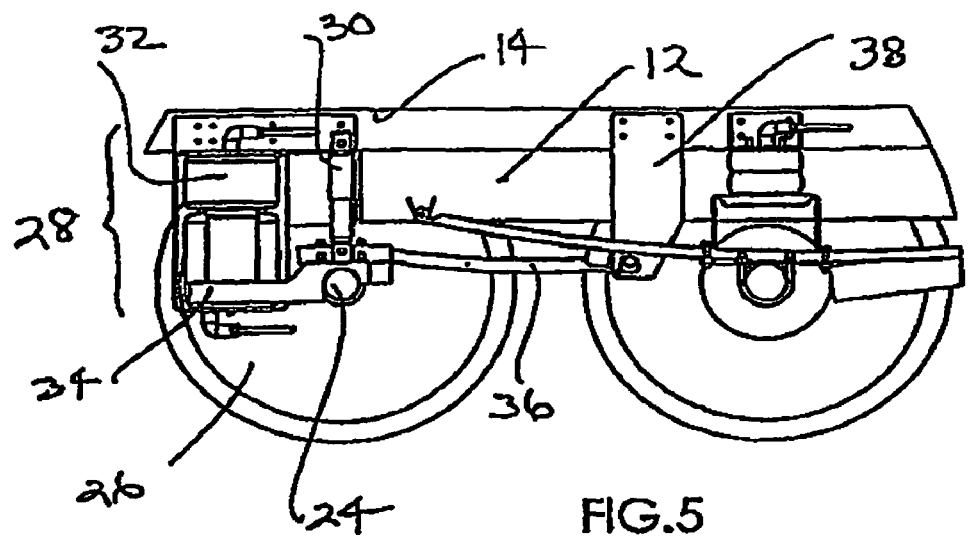
FIG. 5 is a partial, detail view indicated by the circle in FIG. 4.

Extra axle 24 and extra wheel set 26 are pivotally connected to extra frame set 14 near its back end (see FIGS. 4 and 5). The extra axle and wheels are supported by a pair of extra axle support assemblies 28 which depend downwardly from extra frame set 14. Each extra axle support assembly preferably comprises a shock absorber 30 directly above extra axle 24, and extra axle air bag 32 spaced slightly, in this case, above and to the rear of extra axle 24, and an air bag support frame 34 which pivotally connects air bag 32, and linearly connects shock absorber 30, to extra axle 24. Each extra axle support assembly 28 also comprises pivoting connecting spring rod 36 which is pivotally connected to forwardly spaced-apart and downwardly depending, from extra frame set 14, pivot bracket 38. Preferably, pivot bracket 38 is several feet forward on extra frame set 14 from extra axle support assembly 28.

Figure 2:
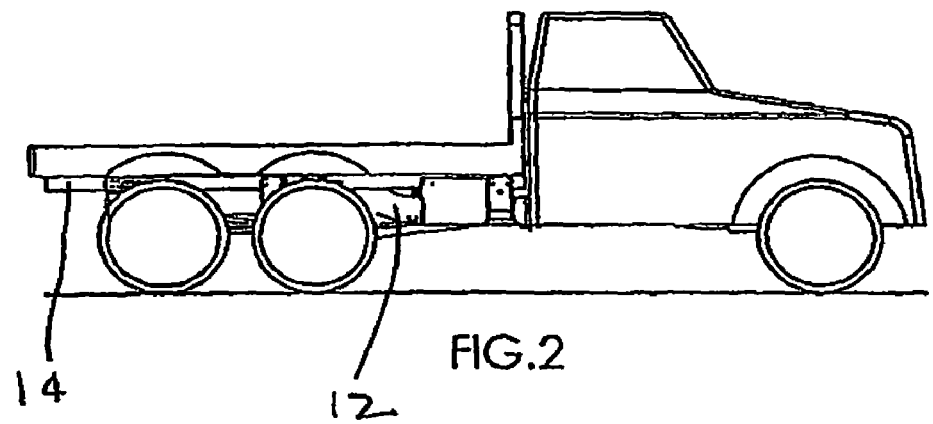
FIG. 2 is a side, schematic view of the embodiment depicted in FIG. 1 with the rear extra axle and wheel set in the lowered, on-the-roadway position.
Figure 3:
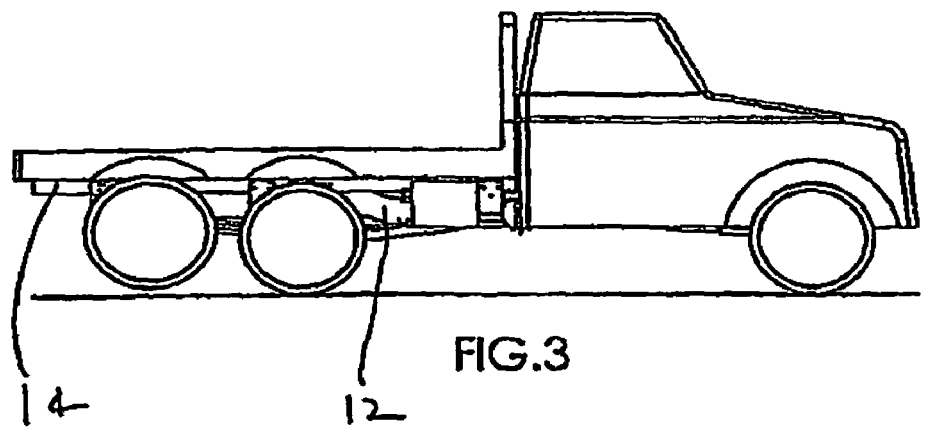
FIG. 3 is a side, schematic view of the embodiment depicted in FIG. 1 with the rear extra axle and wheel set in the raised, off-the-roadway position.
Figure 6:
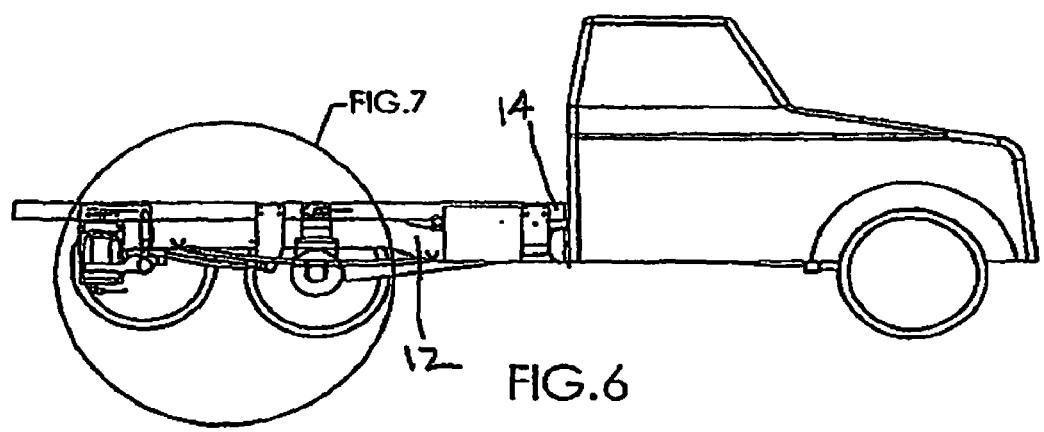
FIG. 6 is a side, schematic view of the wheels-up position depicted in FIG. 3, with the right side rear wheels removed.
Figure 7:
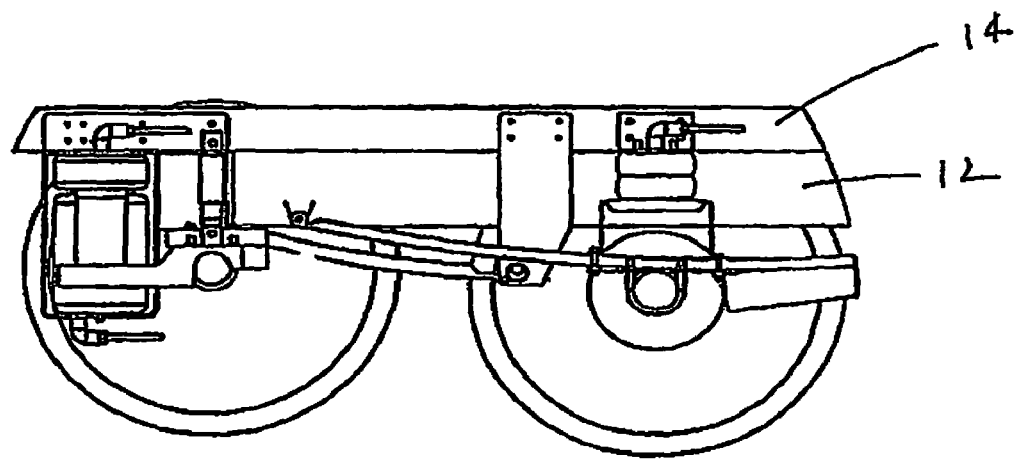
FIG. 7 is a partial, detail view indicated by the circle in FIG. 6.
Figure 8:
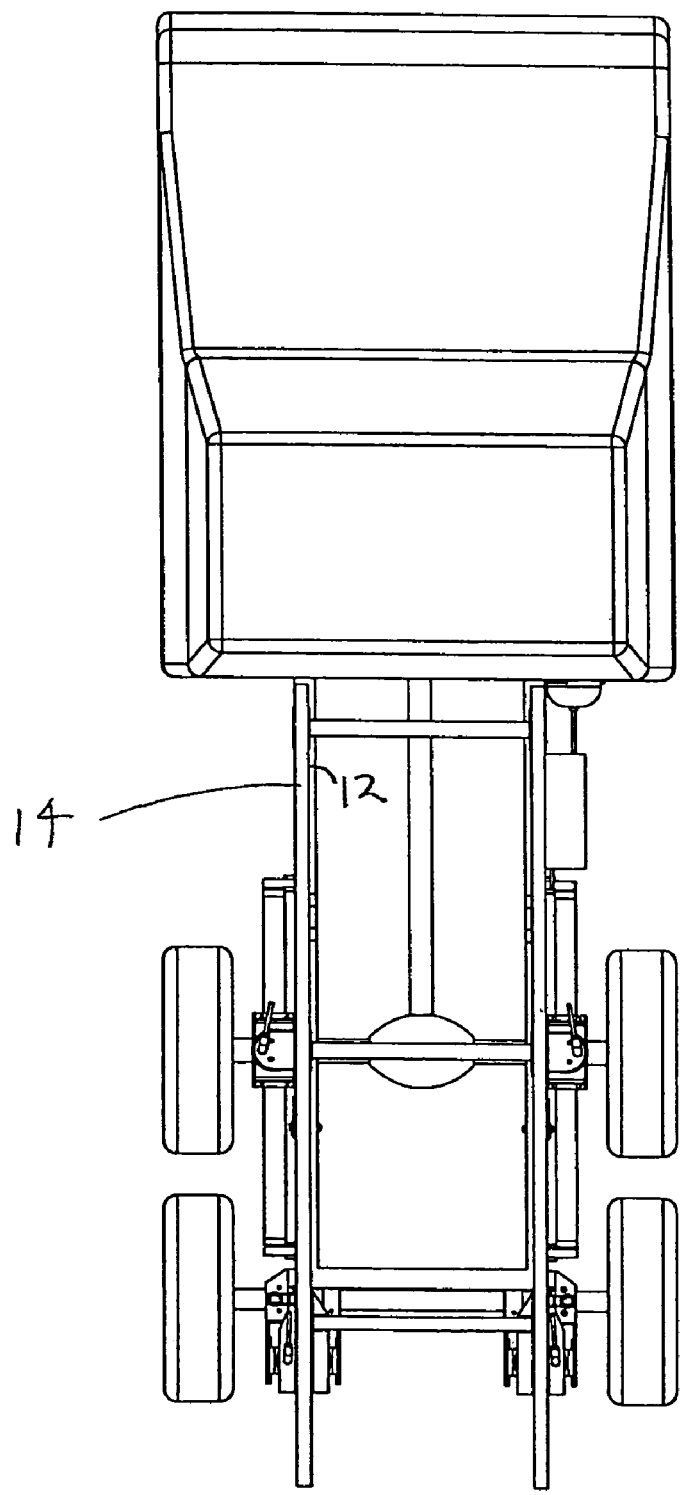
FIG. 8 is a top view of the embodiment depicted in FIG. 1.
Figure 9:
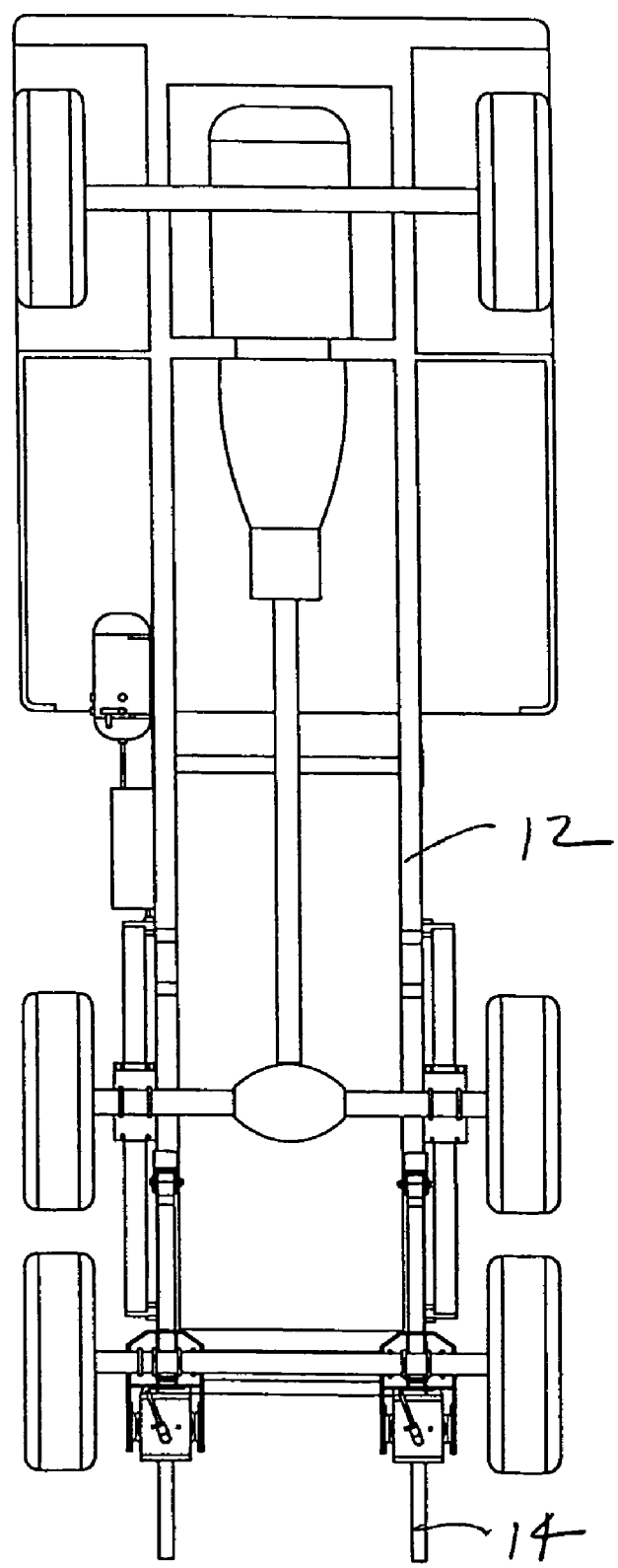
FIG. 9 is a bottom view of the embodiment depicted in FIG. 1.
Figure 10:
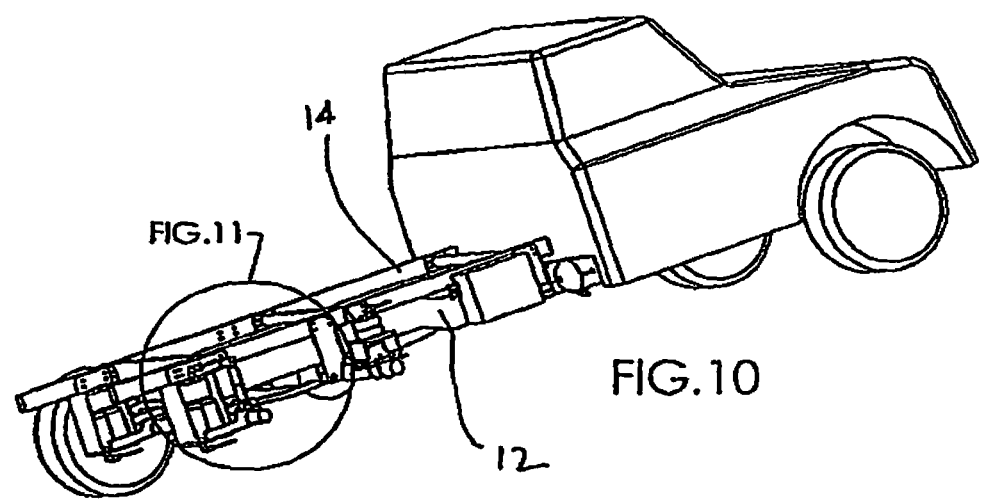
FIG. 10 is a rear, perspective view of the embodiment depicted in FIG. 1, with the right side rear wheels removed.
Figure 11:
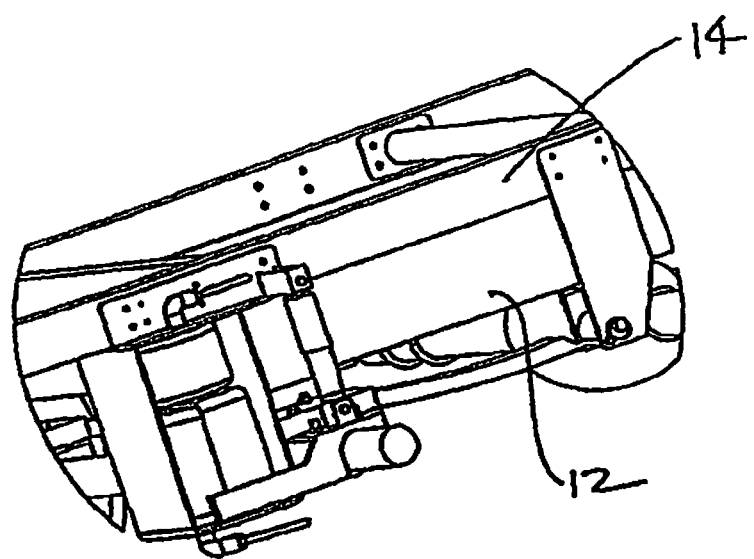
FIG. 11 is a partial, detail view indicated by the circle in FIG. 10.

During use of the present invention, additional air pressure is provided via conventional technique to extra axle air bag 32 to expand it and lengthen it, and to pivot extra axle support assembly 28 downwardly about pivot bracket 38 (compare FIGS. 6 and 7, wherein an embodiment of the present invention is depicted in the wheels-up position, and FIGS. 4 and 5, wherein an embodiment of the present invention is depicted in the wheels-down position). This additional air pressure lowers extra axle support assembly 28 down onto the roadway, and ready to provide extra support for any additional weight load on bed 22. During non-use of the present invention, air pressure to extra axle air bag 32 is reduced via conventional techniques to contract it and shorten it. This reduced air pressure pivots extra axle support assembly 28 upwardly about pivot bracket 38, and raises extra axle support assembly 28 up off of the roadway, and out of the way for less drag and better gas mileage, for example, when the weight load on bed 22 is not very great (compare FIG. 3, wherein an embodiment of the present invention is depicted in the wheels-up position, and FIG. 2, wherein an embodiment of the present invention is depicted in the wheels-down position).

In FIGS. 8-11, it may be easily seen that extra frame set 14 overlies and/or extends along original frame 12. By "overlies" we mean that extra frame set 14 generally lays on top of, and is supported by, original frame 12. Extra frame set 14 is secured to original frame 12 by conventional means, for example, by bolting or welding. Therefore, an equivalent structure for extra frame set 14 is any generally rectangular frame which is connected to and supported by original frame 12, and which supports and secures a pair of extra axle support assemblies, one on each side near the rear of extra frame set 14. Extra frame set 14, then, may extend along side of, or even beneath, original frame 12, so long as it is connected to and supported by it.

Figure 12:
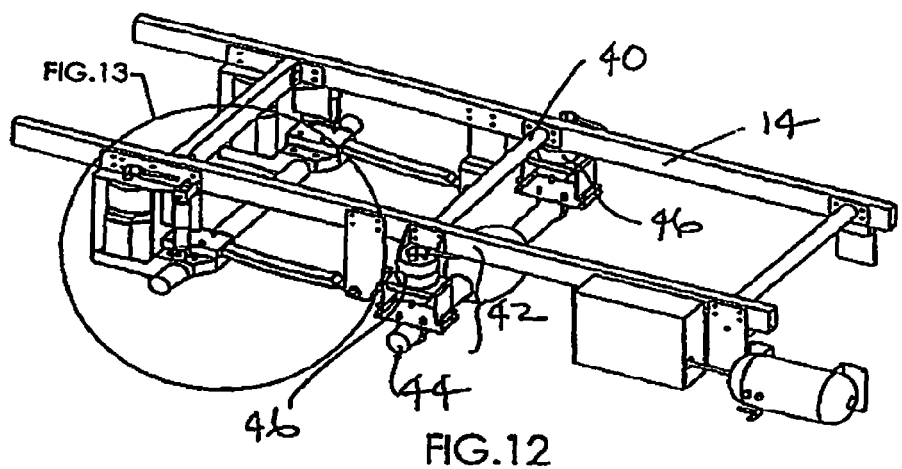
FIG. 12 is a front, schematic, perspective view of the extra frame set according to one embodiment of the invention.
Figure 13:
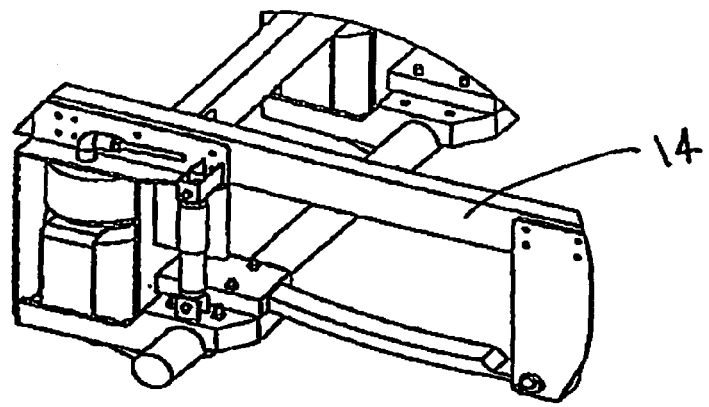
FIG. 13 is a partial, detail view indicated by the circle in FIG. 12.
Figure 14:
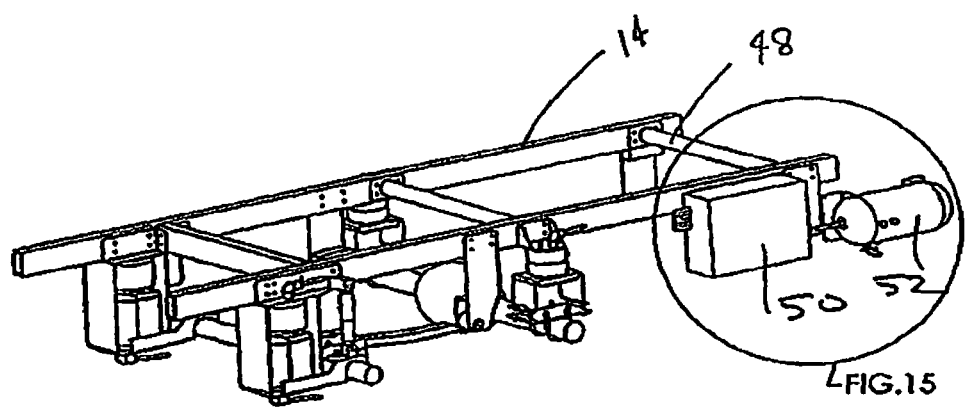
FIG. 14 is a rear, schematic, perspective view of the extra frame set depicted in FIG. 12.
Figure 15:
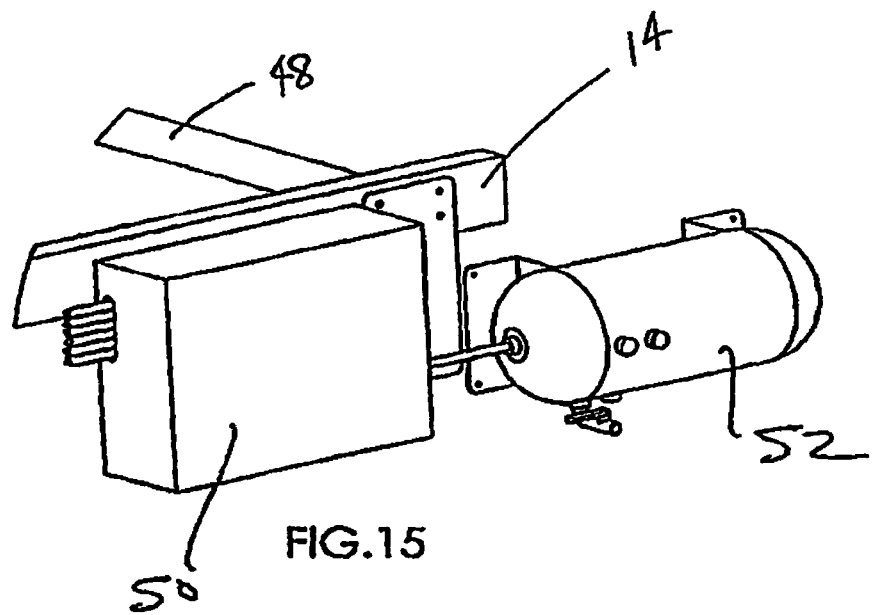
FIG. 15 is a partial, detail view indicated by the circle in FIG. 14.

Optionally, extra frame set 14 also has a second, middle transverse strut 40, and a primary rear axle suspension assembly 42 near its middle (see FIGS. 12 and 13). The primary rear axle suspension assembly 42 depends downwardly from the extra frame 14, and assists with the suspension of the original rear axle 44, and original rear wheels 20, of the truck. A set of original rear suspension air bags 46, one on each side of the extra frame 14, acts to assist, in conventional manner, in the suspension of the original rear wheels 20.

Optionally, also, the extra frame 14 has a third, front transverse strut 48, and a suspension air control unit 50, and a pressurized air reservoir 52 for the air bags 32 and 46, near its front end, just behind the cab of the truck 10. The suspension control unit 50 and reservoir 52 cooperate, via conventional techniques, with the two air bags 32 in the extra axle support assembly 28, and the two air bags 46 in the primary rear axle suspension assembly 42, to control the rear suspension of the truck 10.

Although this invention has been described above with reference to particular means, materials and embodiments, it is to be understood that the invention is not limited to these disclosed particulars, but extends instead to all equivalents within the scope of the following claims.

We claim:

1. A truck frame and attachment assembly for a vehicle with a cab, and an original frame, said original frame with a back end and a front end, with said cab positioned on said front end of said frame, with a left original frame member and a right original frame member and an original rear axle and wheel set with a left original rear wheel and spring and a right original rear wheel and spring, for adding load carrying capacity without additional stiffness to said vehicle, the frame and attachment assembly comprising:

an extra frame set with a left side frame member and a right side frame member, configured for attachment to the top of said corresponding left original frame member and right original frame member, said extra frame set attached to the top of said original frame's back end between said original rear axle and said cab an extra axle support assembly with a left and right support assemblies, attached to said left and right side frame member near an extra frame back end, said left and right extra axle support assembly attached to and depending from said left and right side frame members and supporting an extra axle and extra left wheel and extra right wheel set near the bottom of said left and right extra axle support assembly;

the extra axle pivotally attached to said extra frame set with an extra left and extra right wheel, said extra axle pivotable relative to said extra frame set so that its position relative thereto may be adjusted;

a primary set of air bags for support of said left original rear wheel and said right original wheel, with said airbags attached to said extra frame set at one end, and to said original axle at a second end, with each of said primary air bags for said original rear wheels configured for pressure adjustment by a flow of air to each of said primary set of air bags; and an extra set of air bags for said left extra wheel and said right extra wheel attached at one end to said extra frame set and at a second end to said extra axle, with each air bag configured for pressure adjustment by a flow of air to each of the said extra set of air bags, with said air bags adjustable with said extra frame set resulting in a vehicle with an extra frame attached to an original frame, with said extra frame set including an extra axle, wheels and air bag suspension supporting said extra axle.

2. The truck frame attachment assembly of claim 1 wherein said extra frame set extends from the original frame's back end to said cab and in which said extra frame set with attached axle is removable from said truck.

3. The truck frame and attachment assembly of claim 1, wherein said extra frame set is a generally horizontal, rectangular assembly with a plurality of transverse members that lays over the top of, is removably attached to, and extends along the original frame and comprises the pivotally attached extra axle.

4. The truck frame attachment assembly of claim 1 wherein said extra axle support assembly comprises a set of pivoting connecting rods that extend forwardly from the bottom of the extra axle support assembly to pivot brackets that also depend down from the extra frame set several feet forward of the extra axle support assembly.

5. The truck frame attachment assembly of claim 1 wherein the position of said extra axle support assembly is adjusted by the extra set of air bags, one on each side of said extra frame set, with each air bag configured for pressure adjustment by a flow of air to each air bag.

6. The truck frame attachment for a vehicle of claim 1 which further comprises a suspension air control unit and a pressurized air reservoir for control of air pressure in said primary set of air bags and said extra set of air bags.

7. A truck frame and attachment assembly for a vehicle with a cab, and an original frame with a back end and a front end, with said cab positioned on said front end of said frame, with a left original frame member and a right original frame member and an original rear axle and wheel set with a left original wheel and spring and a right original wheel and spring, for adding load carrying capacity without additional stiffness to said vehicle, the frame and attachment assembly comprising:

an extra frame set with a left side frame member and a right side frame member, configured for attachment to a corresponding left original frame member and right original frame member, attached to the top side of said original frame's back end between said original rear axle and said cab;

an extra axle support assembly with a left support assembly and right support assembly, said support assemblies attached to said left side frame member and right side frame member near the left extra frame set back end and right extra frame set back end, said left extra axle support assembly and said right extra axle support assembly attached to and depending from said left side frame member and said right side frame member, and supporting an extra axle and extra left wheel and right wheel near the bottom of said left extra axle support assembly and said right extra axle support assembly; and said extra axle being pivotable relative to said extra frame set so that its position relative thereto may be adjusted;

a set of air bags for supporting said extra left wheel and said extra right wheel and a set of primary air bags for supporting said left original wheel and said right original wheel, said airbags attached to said extra frame set at one end, and to said original axle at a second end with each of said primary air bags configured for pressure adjustment by a flow of air to each said air bag, with said extra frame set resulting in a vehicle with an extra frame attached to an original frame, with said extra frame set including an extra axle, wheels and air bag suspension supporting said extra axle; and a suspension air control unit and a pressurized air reservoir for control of air pressure in the said air bags of said left and right extra wheels and said left and right original wheels.

* * * * *